(12) United States Patent
Baehr-Jones

(10) Patent No.: US 10,693,563 B2
(45) Date of Patent: *Jun. 23, 2020

(54) COHERENT OPTICAL RECEIVER

(71) Applicant: Elenion Technologies, LLC, New York, NY (US)

(72) Inventor: Thomas Wetteland Baehr-Jones, Arcadia, CA (US)

(73) Assignee: Elenion Technologies, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/740,617

(22) Filed: Jan. 13, 2020

(65) Prior Publication Data

US 2020/0153514 A1 May 14, 2020

Related U.S. Application Data

(63) Continuation of application No. 16/223,853, filed on Dec. 18, 2018, now Pat. No. 10,567,087, which is a continuation of application No. 15/841,789, filed on Dec. 14, 2017, now Pat. No. 10,205,535.

(51) Int. Cl.
*H04B 10/64* (2013.01)
*H04B 10/61* (2013.01)
*H04J 14/06* (2006.01)

(52) U.S. Cl.
CPC ......... *H04B 10/64* (2013.01); *H04B 10/6165* (2013.01); *H04B 10/6166* (2013.01); *H04J 14/06* (2013.01)

(58) Field of Classification Search
None
See application file for complete search history.

(56) References Cited

U.S. PATENT DOCUMENTS

| 2010/0266291 | A1* | 10/2010 | Boffi | H04B 10/61 398/159 |
| 2012/0155887 | A1* | 6/2012 | Youn | H04B 10/0775 398/182 |
| 2015/0270905 | A1* | 9/2015 | Rasmussen | H04B 10/541 398/186 |

* cited by examiner

*Primary Examiner* — Casey L Kretzer
(74) *Attorney, Agent, or Firm* — Stratford Managers Corporation

(57) ABSTRACT

An optical IQ demodulator that does not require a power-consuming DSP is disclosed. A DC offset is added to one of the I and Q optical signal components at an IQ transmitter. After mixing with an LO signal and differential detection at the receiver, this DC offset results in a heterodyne-frequency tone in each of the quadrature detection channels of the receiver. The phase of this oscillation is recovered using a PLL circuit, which output is used to separate the transmitter I and Q channels for decoding thereof using conventional electronics.

16 Claims, 9 Drawing Sheets

COHERENT OPTICAL RECEIVER

CROSS-REFERENCE TO RELATED APPLICATIONS

This application is a continuation of U.S. patent application Ser. No. 16/223,853, filed Dec. 18, 2018, now allowed, which is a continuation of U.S. patent application Ser. No. 15/841,789, filed Dec. 14, 2017, now U.S. Pat. No. 10,205,535, which are hereby incorporated by reference herein in their entireties.

FIELD OF THE INVENTION

The invention generally relates to coherent optical receivers, and more particularly relates to an apparatus and method for demodulating optical quadrature modulated signals.

BACKGROUND OF THE INVENTION

Optical waveguide modulators used in high-speed optical communications, such as those based on waveguide Mach-Zehnder (MZ) interferometric structures, may require active control of their operating conditions, and in particular of their bias voltage that sets the relative phase of interfering light waves in the modulator in the absence of the modulation signal. The waveguides of the modulator are typically formed in an electro-optic material, for example a suitable semiconductor or $LiNbO_3$, where optical properties of the waveguide may be controlled by applying a voltage. Such a waveguide modulator may be a part of an optical integrated circuit (PIC) implemented in an opto-electronic chip.

Very high speed optical systems may benefit from one of quadrature modulation (QM) formats such as the Quadrature phase shift keying (QPSK) and Quadrature Amplitude Modulation (QAM). These modulation formats may be realized using a quadrature modulator which is typically implemented using nested MZ interferometric structures. For example, a QAM optical signal may be generated by splitting light from a suitable light source between two MZ modulators (MZM) that are synchronously driven by an in-phase (I) modulation signal and a quadrature (Q) modulation signal that carry respective I and Q components of an electrical QAM or QPSK signal, and then combining the resulting I-channel and Q-channel light signals in quadrature, i.e. with a relative optical phase shift $\phi_{IQ}$ equal to 90°, or $\pi/2$ radians (rad). For example the two MZMs of a quadrature modulator may each be modulated by a BPSK (binary phase shift keying) signal while being biased at their respective null transmission points for push-pull modulation. When their outputs are added together in quadrature, i.e. with the relative phase shift $\phi_{IQ}=\pi/2$, a QPSK signal (Quaternary phase shift keying) results.

At a receiver site, the QM modulated signal may be coherently combined with light from a local oscillator (LO) source, typically using a 90° optical hybrid, which outputs are coupled to one or more differential receivers. The phase of the LO light relative to the received light signal is however typically unknown, and digital signal processing is conventionally used to perform phase recovery and extract the transmitter I-channel and Q-channel signals from the detected electrical signals at the outputs of the differential detectors. This signal processing may be relatively complex and thus typically require relatively power-consuming and expansive digital signal processors.

Accordingly, it may be understood that there may be significant problems and shortcomings associated with current solutions and technologies for demodulating optical quadrature modulated signals.

SUMMARY OF THE INVENTION

An aspect of the present disclosure relates to a method for coherent demodulation of quadrature-modulated (QM) light comprising an I-channel signal and a Q-channel signal, the method comprising: a) at a transmitter site, providing an offset in one of the I-channel and Q-channel signals; b) at a receiver site, performing optical quadrature heterodyne detection of the QM light to obtain two electrical signals, each of the electrical signals comprising the I-channel signal modulated at a heterodyne frequency (HF), the Q-channel signal modulated at the HF $\omega_{HF}$, and a heterodyne frequency (HF) tone; c) filtering the two electrical signals at the HF $\omega_{HF}$ with a narrow-band phase-sensitive filter to extract the HF tones therefrom; and, d) using the HF tones obtained in c) to decompose the I-channel and Q-channel signals from the two electrical signals.

Performing the optical quadrature heterodyne detection may comprise mixing the QM light with local oscillator (LO) light using a 90 degrees optical hybrid (OH), wherein the LO light is shifted in frequency from the QM light by the HF $\omega_{HF}$; and, detecting mixed optical signals from outputs of the OH using two differential photodetectors to obtain the two detected electrical signals.

In one implementation of the method, providing the offset in one of the I-channel and Q-channel signals may include providing a DC bias offset to an optical modulator driven by one of the I and Q channel signals.

An aspect of the disclosure provides an apparatus for coherent demodulation of quadrature-modulated (QM) light comprising an I-channel signal and a Q-channel signal, wherein the QM light comprises an offset in one of the I-channel and Q-channel signals. The apparatus may comprise a first optical receiver that comprises an optical heterodyne receiver and an IQ demodulator. The optical heterodyne receiver is configured to perform optical quadrature heterodyne detection of the QM light to obtain two electrical signals, each of the electrical signals comprising the I-channel signal modulated at a heterodyne frequency (HF), the Q-channel signal modulated at the HF $\omega_{HF}$, and a heterodyne frequency (HF) tone. The IQ demodulator comprises a phase-sensitive narrow-band filter circuit configured to extract the HF tones from the two electrical signals, and an HF demodulation circuit, and an HF demodulation circuit coupled to the phase-sensitive narrow-band filter circuit and the optical heterodyne receiver and configured to decompose each of the I-channel and Q-channel signals from the two electrical signals using the HF tones extracted therefrom. The HF demodulation circuit may comprise a network of four signal multiplication circuits and two signal summing circuits.

In accordance with an aspect of the present disclosure, the apparatus may be configured to receive polarization multiplexed (PM) light wherein the QM light is polarization multiplexed with a second QM light, and wherein the QM light comprises a distinct dither signal that is absent from the second QM light. The apparatus may include a tunable polarization splitter disposed to receive the PM light and configured to tunably split the PM light into two light signals responsive to a control signal, the tunable polarization splitter comprising a first output port optically coupled to the first optical receiver and a second output port. A second IQ demodulator may be optically coupled to the second output port of the polarization splitter. A dither detection circuit may be coupled to one of the two output ports of the tunable polarization splitter and may be configured to detect the distinct dither signal therein and to output a dither strength signal indicative of strength of the detected distinct dither signal. A control circuit may be coupled to the tunable polarization splitter and configured to vary the control signal so as to minimize or maximize the strength of the first dither signal thereby aligning the two light signals to transmitter polarization channels.

BRIEF DESCRIPTION OF THE DRAWINGS

Embodiments disclosed herein will be described in greater detail with reference to the accompanying drawings, which may be not to scale and in which like elements are indicated with like reference numerals, and wherein.

DETAILED DESCRIPTION

Figure 1:
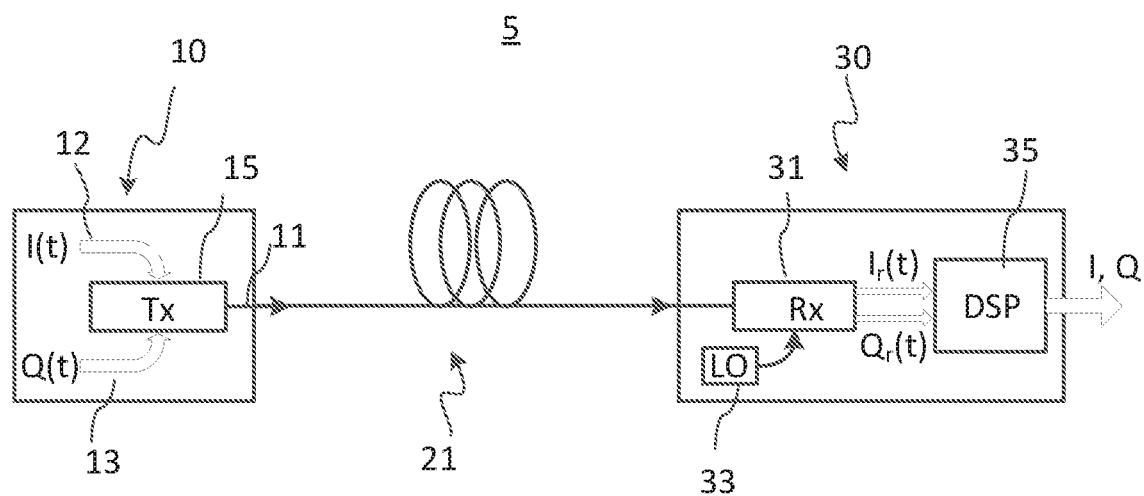
FIG. 1 is a schematic diagram of an optical communication link using quadrature modulated optical signals and coherent reception.

In the following description, for purposes of explanation and not limitation, specific details are set forth, such as particular optical circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:
GaAs Gallium Arsenide
InP Indium Phosphide
PIC Photonic Integrated Circuits
SOI Silicon on Insulator
PSK Phase Shift Keying
BPSK Binary Phase Shift Keying
QAM Quadrature Amplitude Modulation
QPSK Quaternary Phase Shift Keying
DC Direct Current
AC Alternate Current
DSP Digital Signal Processor
FPGA Field Programmable Gate Array
ASIC Application Specific Integrated Circuit In the following description, the term "light" refers to electromagnetic radiation with frequencies in the visible and non-visible portions of the electromagnetic spectrum. The term "optical" relates to electromagnetic radiation in the visible and non-visible portions of the electromagnetic spectrum. The terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The word 'using', when used in a description of a method or process performed by an optical device such as a polarizer or a waveguide, is to be understood as referring to an action performed by the optical device itself or by a component thereof rather than by an external agent. Notation $V\pi$ refers to a bias voltage of a Mach-Zehnder modulator (MZM) that corresponds to a change in a relative phase delay between arms of the MZM by $\pi$ rad, or 180 degrees, which corresponds to a change from a minimum to a next maximum in the MZM transmission.

The term "90° optical hybrid" refers to an optical device that combines two input optical signals 'S' and 'LO' to produce four mixed output optical signals in which the two input optical signals are added with an optical phase shift $\phi_{12}$ that increments by 90°, or $\pi/2$ radian, from one output to another.

One aspect of the present disclosure relates to receiving and demodulating optical quadrature-modulated signals. Such signals are typically generated at a transmitter site by combining two modulated optical signals in quadrature, i.e. with an optical phase shift therebetween of 90 degrees, or $\pi/2$ radian. The two optical signals being added at the transmitter in quadrature are commonly referred to as the I (in-phase) optical signal and the Q (quadrature) optical signal. It will be understood however that this designation is somewhat arbitrary and can be reversed by selecting a different initial phase. The I and Q optical signals are each independently PSK and/or ASK modulated with a corresponding electrical I or Q modulation signal, so that the resulting transmitter light is QAM or QPSK modulated.

FIG. 1 generally illustrates an example optical transmission system 5 using QM optical signals. At a transmitter site 10, an optical transmitter (Tx) 15 receives two electrical data signals of the I-channel and the Q-channel, denoted un the figure as I(t) 12 and Q(t) 13 respectively, and uses them as modulation signals to modulate two light beams, which are then combined in quadrature with the 90 degrees optical phase shift therebetween to generate a QM optical signal 11 S(t). Mathematically this signal may be described by the following equation (1):

$$S(t) = S_0 \cdot \rho(t) \cdot \exp(j\omega_t t + \phi(t)) \qquad (1)$$

where $\rho(t)$ and $\phi(t)$ are the modulated amplitude and phase of the QM optical signal 11, $\omega_t$ is the frequency of the optical carrier, and i is the imaginary unit.

Figure 2A:
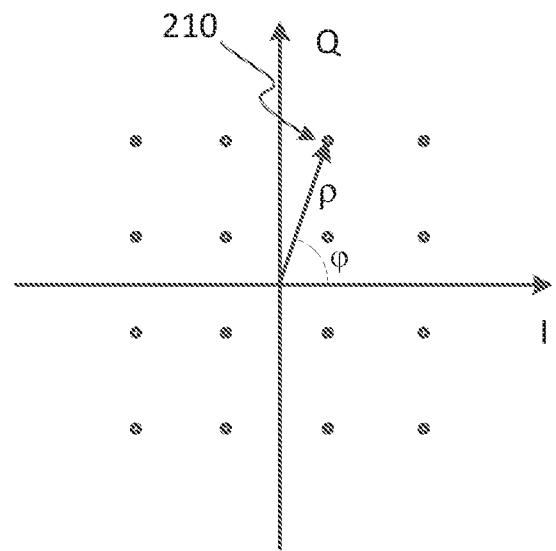
FIG. 2A is a graph illustrating a constellation of a conventional 16-QAM optical signal.

FIG. 2A illustrates by way of example a constellation corresponding to a 16-QAM optical signal that may be generated with the Tx 15, showing all possible values of a 16-QAM symbol in a complex (I, Q) plane. Each point 210, shown with an open circle, represents one possible combination ($\phi$, $\rho$) of the optical phase $\phi$ and the optical amplitude $\rho$ of a 16-QAM symbol in the (I, Q) plane of the transmitter. For the 16-QAM example, each of the I and Q components can have 4 possible values. Hence, a total of 2×2×2=8 bits can be sent in total for each QAM symbol period. Using the 16 QAM modulation, a 50 Gbaud signal can carry 400 Gbit/s of information.

Referring back to FIG. 1, the Tx-generated QM optical signal 11 propagates along a fiber-optic link 21 to a receiver site 30, where it is to be demodulated, i.e. the transmitter modulation signals I(t) and Q(t), which carry data of the respective information channels, separately extracted in the form of two electrical data signals. This may be done using a coherent optical receiver (Rx) 31 in which the received optical signal 11 is coherently mixed with reference light, for example generated by a local oscillator (LO) source 33, and with phase-shifted versions of the reference light, to produce another pair of electrical signals $I_r(t)$ and $Q_r(t)$ that are in a quadrature relationship to each other. This optical mixing and EO conversion may be performed, for example, using a 90 optical hybrid (OH) coupled to a pair of differential photodetectors. However, since the relationship between the optical phase of the LO light 32 and the received light 11 is typically unknown, each of the $I_r$ and $Q_r$ signals extracted at the receiver includes both the transmitter I-channel signal and the transmitter Q-channel signal. As the optical phase of the LO light is typically not locked to that of the QM light 11 generated at the transmitter, a phase recovery mechanism is required at the receiver site 30 to obtain the transmitter I(t) and Q(t) signals from the receiver detected quadrature signals Ir(t) and Qr(t). The phase recovery and the separation of the I and Q transmitter channels is a non-trivial task and is typically performed by a suitably programmed digital signal processor (DSP) 35.

Figure 2B:
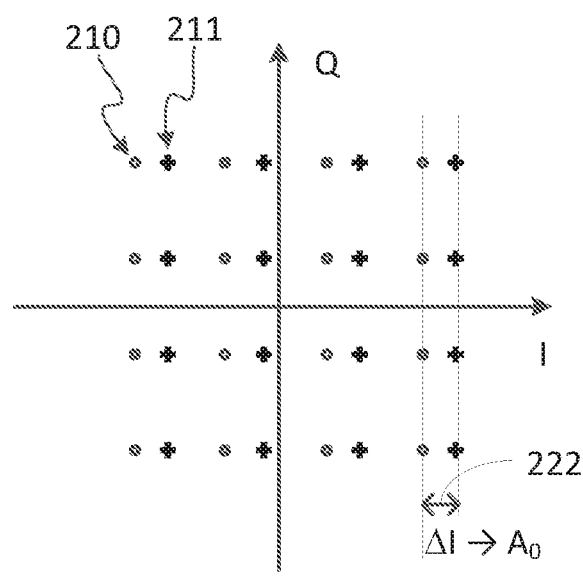
FIG. 2B is a graph illustrating a constellation of a 16-QAM optical signal with a DC shift in the "I" modulation signal component.

Turning now to FIG. 2B, there is illustrated a constellation diagram of a 16 QAM signal that is slightly modified in accordance with an aspect of the present disclosure, by adding a DC offset 222 to one of the two quadrature components thereof, in the shown example—to the I-channel modulation signal. The constellation of the modified 16 QAM signal with the DC offset is shown with crosses 211, while the constellation of a conventional 16 QAM signal is shown in the same figure with open circles 210. Advantageously, the addition of this DC offset 222 enables simplifying the phase recovery at the receiver and the separation of the Tx-generated I and Q modulation signals, potentially eliminating the need for a receiver DSP.

Figure 3:
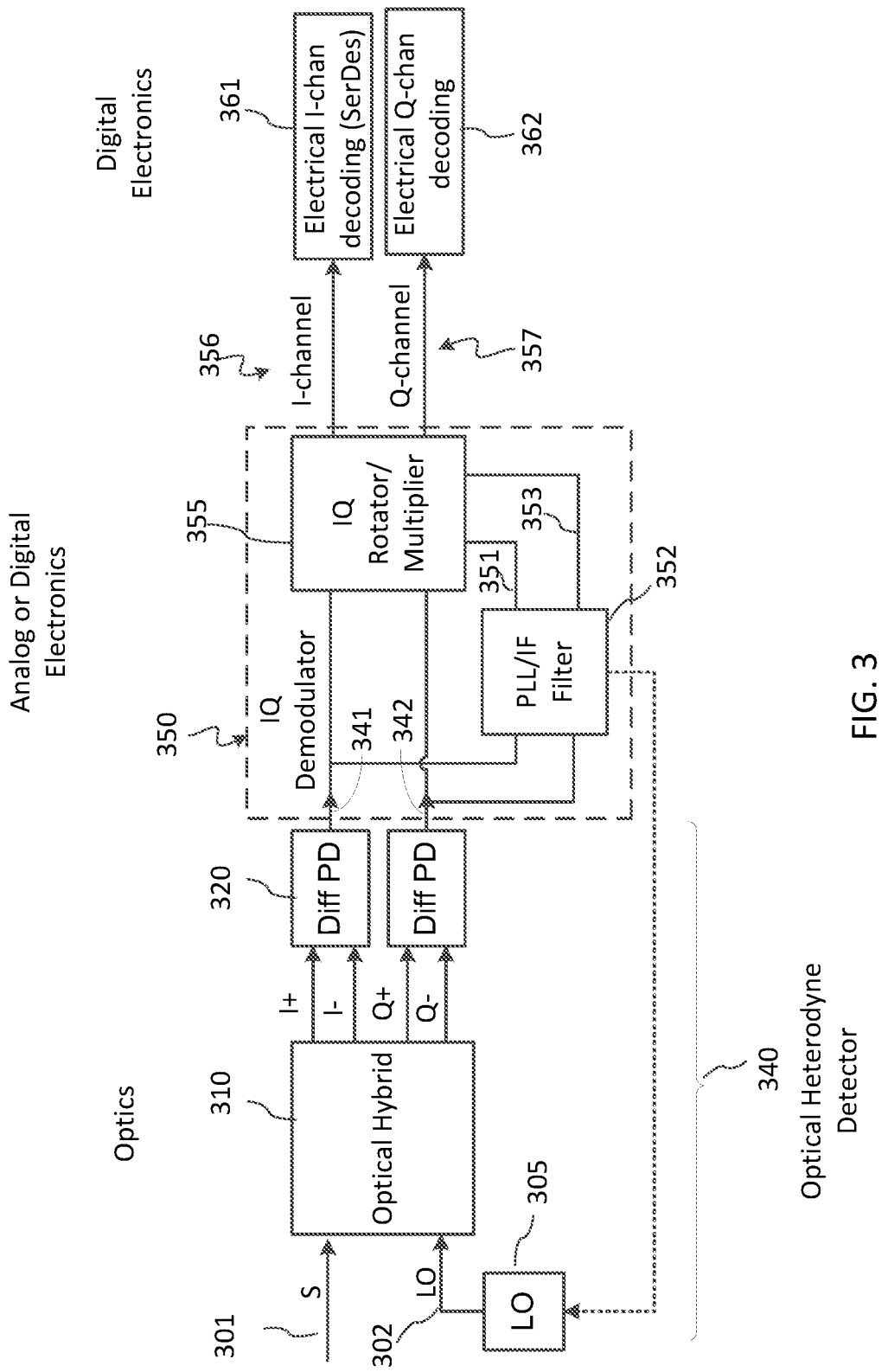
FIG. 3 is a schematic diagram of a coherent optical receiver circuit including a PLL-based IQ demodulation circuit.

With reference to FIG. 3, there is schematically illustrated a block diagram of an example embodiment of an optical coherent receiver that is configured to make use of the presence of a DC offset 222 in the received QM signal for phase recovery and IQ demodulation. The receiver uses a simplified IQ demodulator circuit 350 to separate the Tx-generated I and Q signals of a received QM optical signal 301 S(t) having the DC offset 222 in one of the quadrature modulation components thereof. Similarly to a conventional coherent optical QM receiver, the receiver of FIG. 3 includes at its front-end an electro-optical (EO) heterodyne converter 340, which may also be referred to as the heterodyne detector 340, and which includes a 90° OH 310 followed by a pair of differential photodetectors 320. The OH 310 has two input ports, one for receiving the QM light 301 and another for receiving LO light 302 from an LO source 305. The LO source 305 may generate light that slightly differs in frequency from the QM signal light 301 to provide for a heterodyne detection. The difference in frequency $\omega_{HF}$ between the QM light 301 and the LO light 302, which may be referred to herein as the heterodyne (HF) frequency, may be, for example, in the range of few MHz to few hundred MHz, but may also be outside of this range. The received QM optical signal 301 S(t) and the LO optical signal 302 $S_{LO}$ at the OH inputs may be represented by the following two equations (2) and (3), respectively:

The QM optical signal S(t) having this DC offset 222 may be described by a following equation (2):

$$S(t) = (A_0 + A(t)) \cdot \sin(\omega_t t + \phi_t) + B(t) \cdot \cos(\omega_t t + \phi_t), \qquad (2)$$

$$S_{LO} = C \sin(\omega_l t + \phi_l) \qquad (3)$$

where A(t) and B(t) represent the Tx-generated I and Q modulation signals, respectively, $\omega_t$ is the optical frequency of the QM light, $\omega_l$ is the optical frequency of the LO light, $\phi_t$ and $\phi_l$ are the optical phases of the QM and LO lights at the point of mixing in the OH 310.

In operation OH 310 outputs four mixed optical signals that are denoted as I+, I−, Q+, and Q−, and in which the signal light S 301 and the LO light 302 are coherently mixed with an optical phase shift therebetween that increments by 90° from one output signal to another. Four output optical ports of the OH 310 are coupled to the two differential photodetectors (DPDs) 320 in a manner known in the art, so that each differential detector receives two mixed signals in which the signal light S 301 and the LO light 302 are mixed with a 180 degrees optical phase shift therebetween. Differential PDs 320 generate two electrical signals $V_1(t)$ 341 and $V_2(t)$ 342 that may satisfy the following equations (4) and (5):

$$V_1 = I_+ - I_- = C \cdot [(A_0 + A(t)) \cdot CC(t) - B(t) \cdot SS(t)] \qquad (4)$$

$$V_2 = Q_+ - Q_- = C \cdot [(A_0 + A(t)) \cdot SS(t) + B(t) \cdot CC(t)] \qquad (5)$$

where C is a constant and CC(t) and SS(t) are two quadrature harmonic signals or tones at the heterodyne frequency (HF) $\omega_{HF} = (\omega_t - \omega_l)$:

$$CC(t) = \cos((\omega_t - \omega_l)t + (\phi_t - \phi_l)) \qquad (6)$$

$$SS(t) = \sin((\omega_t - \omega_l)t + (\phi_t - \phi_l)) \qquad (7)$$

Thus each of the two electrical signals 341, 342 is proportional to a mixture of the Tx-generated I and Q signals that are modulated with the quadrature HF tones CC(t) and SS(t) given by equations (6) and (7). In the absence of the DC offset 222 in the received QM signal 301, i.e. when $A_0 = 0$, the I and Q signals are not easy to separate from the electrical signals 341, 342 since the LO-signal phase difference $(\phi_t - \phi_l)$ is generally not a priory known and may fluctuate in time. Thus, a phase recovery operation may generally be required, and is conventionally performed using a DSP. However, in the presence of the DC offset $A_0$ the phase recovery is simplified as the two quadrature HF tones CC(t) and SS(t) may be relatively easily extracted from the outputs 341, 342 of the EO converter 350, as they are separately present as additive HF tones in the electrical signals 341 and 342; thus these HF tones may be extracted from the outputs 341, 342 of the heterodyne detector 340 using narrow-band filter circuits that preserve their relative phase, such as for example a two-channel PLL (phase lock loop).

With the modulating HF tones CC(t) and SS(t) known, the Tx generated I and Q signals A(t) and B(t) can be decomposed, i.e. separately extracted, from the output signals 341, 342 of the optical heterodyne detector 340, for example using a quadrature signal rotation operation that mathematically can be described as a matrix multiplication:

$$\begin{pmatrix} CC & SS \\ -SS & CC \end{pmatrix} \cdot \begin{pmatrix} V_1 \\ V_2 \end{pmatrix} \qquad (8)$$

The operation described by expression (8) yields an I-channel output signal $V_I(t)$ 356 that is proportional to the transmitter I-channel signal $I(t)=[A_0+A(t)]$, and a Q-channel output signal $V_Q(t)$ 357 that is proportional to the transmitter Q-channel signal $Q(t)=B(t)$, i.e. i.e. $V_I(t)\sim[A_0+A(t)]=I(t)$ and $V_Q(t)\sim B(t)$. Once separately extracted, the I-channel signal and Q-channel signals 356, 357 may be separately fed into two digital Rx processors 361, 362, which may be for example in the form, or include, suitable serialilzer-deserializer (SerDes) chips, for further separate I-channel and Q-channel data signal processing as known in the art.

Accordingly, in one embodiment the output signals 341, 342 from the coherent EO converter 340 may be fed into an IQ demodulator 350, which performs the heterodyne phase recovery operation and recovers the transmitter-generated I-channel and Q-channel signals. In the illustrated embodiment the IQ demodulator 350 includes a two-channel PLL circuit 352 and an HF demodulation circuit 354, which may also be referred to as the IQ rotator 354. One copy of the electrical signals 341, 342 is fed into the PLL 352, which operates as a narrow-band filter that is tuned to the HF $\omega_{HF}$ and effectively filters out data-rate modulation, outputting as its output signals 351 and 353 the two quadrature HF tones CC(t) and SS(t), preserving their relative phase. Note that in the context of this disclosure, the term 'PLL" refers to any narrow-band filter that is capable of performing that operation. The IQ rotator circuit 354 may be configured to perform the signal rotation/matrix multiplication operation described by equation (8). It demultiplexes the I-channel and Q-channel signals A(t) and B(t) by decoupling them from the HF tones, and feeds the extracted transmitter I-channel and Q-channel signals separately in the form of the electrical output data signals $V_I(t)$ 356 and $V_Q(t)$ 357 to the I-channel and Q-channel processors 361, 362.

Figure 4:
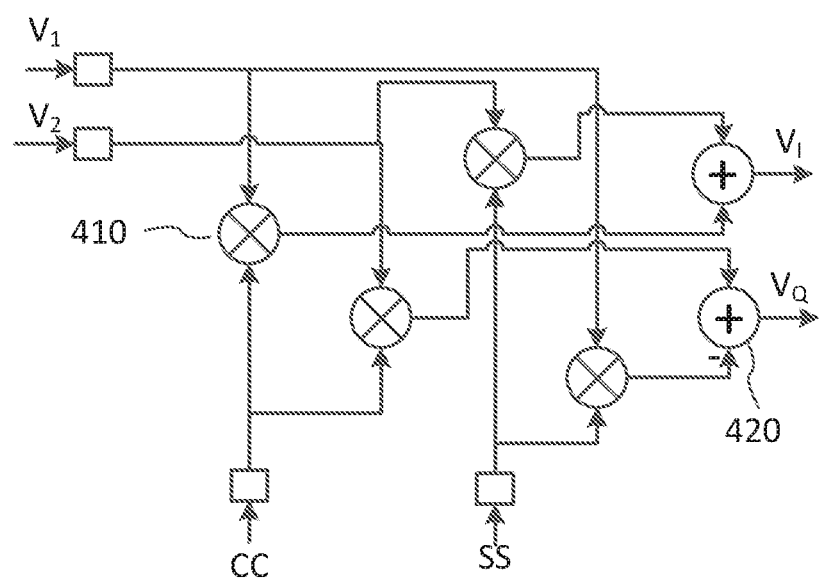
FIG. 4 is a schematic diagram of an embodiment of a quadrature signal rotator used in an IQ demodulation circuit of FIG. 3.

In one embodiment the IQ demodulator 350 may be embodied using analog electrical circuitry. Referring to FIG. 4, the signal rotator/multiplier circuit 354 may be implemented for example as a network of analog or digital signals multipliers 410 and signal adders 420, as would be evident to those skilled in the art. The structure of this network can be understood by noting that the matrix operation given by expression (8) results in the following two equations defining the I-channel output signal $V_I$ and the Q-channel output signal $V_Q$:

$$V_I(t)=CC(t)*V_1(t)+SS(t)*V_2(t) \qquad (9)$$

$$V_Q(t)=CC(t)*V_2(t)-SS(t)*V_1(t) \qquad (10)$$

The IQ demodulator 350 may also be embodied using digital electronics, or a combination of digital and analog circuits. For example, the PLL 352 may be embodied as an analog circuit, while the signal rotator 354 may be implemented using digital logic, for example in a microprocessor, an FPGA, or an ASIC.

The heterodyne frequency $\omega_{HF}$, i.e. the frequency difference between the signal light 301 and the LO light 302, preferably exceeds the linewidth of both the signal and LO light and may be selected for example in the range from about 10 MHz to about 100 MHz, depending on the LO and Tx light linewidths. For example the frequency difference between the signal and LO light may be about 50+/−10 MHz, which enables the use of relatively low-frequency PLL 352.

The LO source 305 may be for example a frequency-tunable semiconductor laser that may be similar to that used at the transmitter and which optical frequency may be actively tuned to maintain the desired frequency offset from the Tx laser when the output frequency of the Tx laser drifts. This can be achieved using a feedback from the PLL 352, which generates signals that are sensitive to HF variations.

Figure 5A:
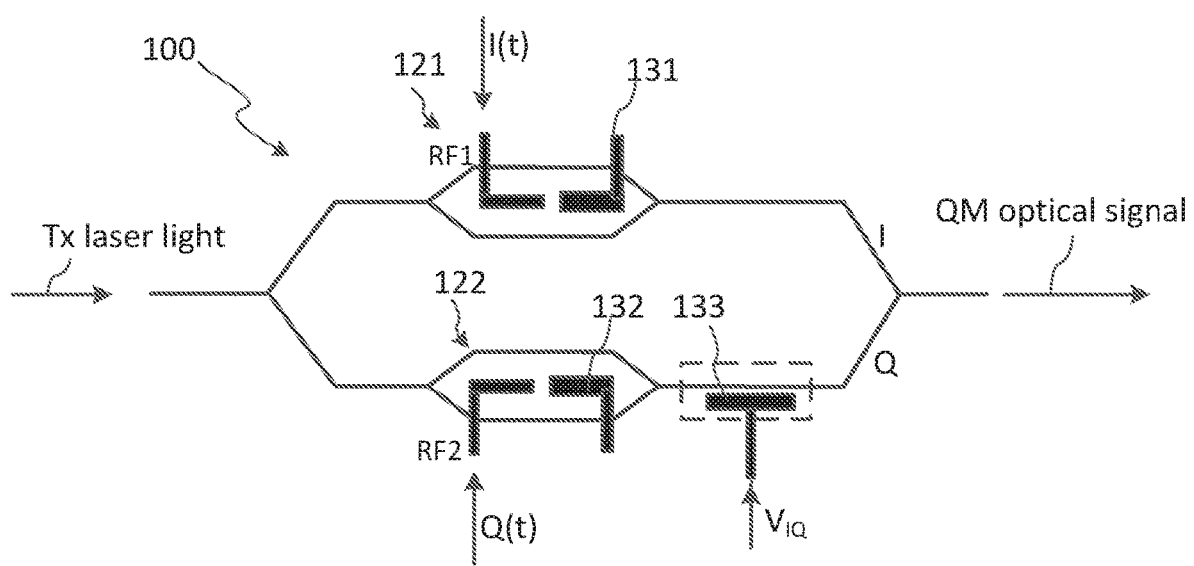
FIG. 5A is a schematic diagram of an optical IQ modulator in the form of a nested Mach-Zehnder interferometer for generating optical quadrature-modulated signals.
Figure 5B:
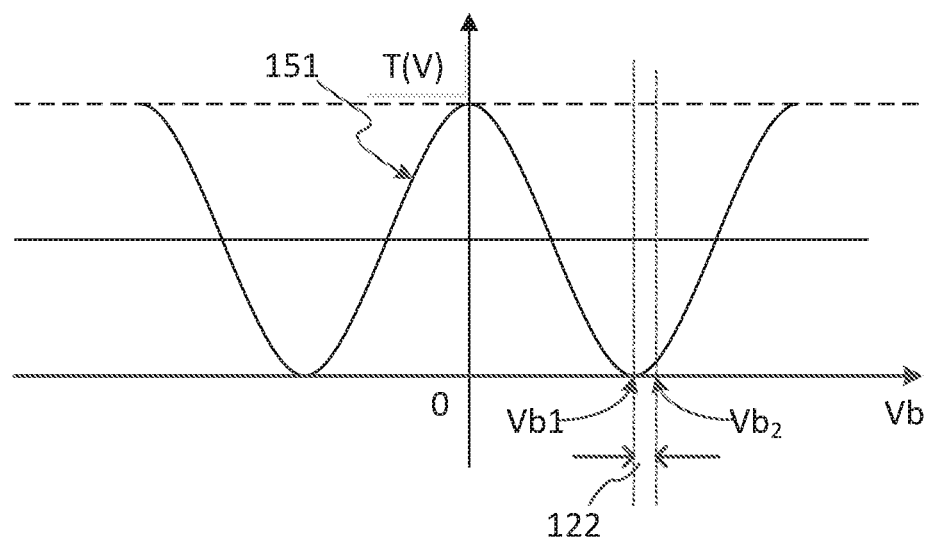
FIG. 5B is a schematic diagram illustrating offset biasing of a Mach-Zehnder modulator relative to an EO transfer curve thereof.

Turning to FIG. 5A, there is illustrated a nested Mach-Zehnder modulator (MZM) that may be used at the Tx site to generate a QM optical signal. It is formed of two inner MZMs 121, 122 disposed in two arms of an outer Mach-Zehnder interferometer (MZI) 100. Each inner MZM includes a signal electrode 121 or 122 and a bias electrode 131 or 132. In operation the signal electrode of one of the inner MZMs receives the I-channel modulating signal I(t), while the signal electrode of the other of the inner MZMs receives the Q-channel modulating signal Q(t). The outer MZI 100 includes a bias electrode 133 that sets the relative optical phase between the inner MZM's outputs at $\pi/2$ at the output optical combiner. FIG. 5B illustrates an optical transfer characteristic of an MZM, i.e. the dependence of the MZM transmission T on a bias voltage Vb. Conventionally the bias electrodes 131, 132 of the inner MZMs 121, 122 set the operating points of the respective MZM to a minimum in its EO transfer characteristic, which corresponds for example to a bias voltage $Vb_1$ indicated in FIG. 5B. This bias setting results in so called push-pull modulation of light in each of the I and Q channels. The DC offset 222 in the QM signal constellation may be provided, for example, by slightly offsetting the bias voltage applied to one of the inner MZMs, increasing or decreasing it, for example increasing it by a small voltage offset 121 from $Vb_1$ to $Vb_2$ as illustrated in FIG. 5B. By way of example, this bias voltage offset 121 may be in the range of $0.001V\pi$ to $0.1V\pi$. In other embodiments the DC offset 222 may be added in the electrical domain to the amplitude of one of the electrical I-channel or Q-channel modulating signal, and both inner MZMs biased at a minimum of the transfer characteristic.

An optical transmitter may be configured to transmit polarization multiplexed (PM) QM light wherein two QM optical signals are mixed together in orthogonal polarization states, which are typically referred to as the X-polarization and the Y-polarization, providing for a doubling of the number of information channels carried by a single wavelength. At the receiver site these two PM light signals, which may be referred to as the X-light and Y-light, have to be separated so that their respective I and Q modulation signals may be separately extracted. However, during the propagation through the optical link 21, these two Tx-defined polarizations may become scrambled in a time dependent way, which complicates their separation at the receiver. The separation of the transmitter-defined X- and Y-polarization channels at the receiver may be assisted however by adding a distinct dither signal to one of the two polarization channels at the transmitter.

Figure 6:
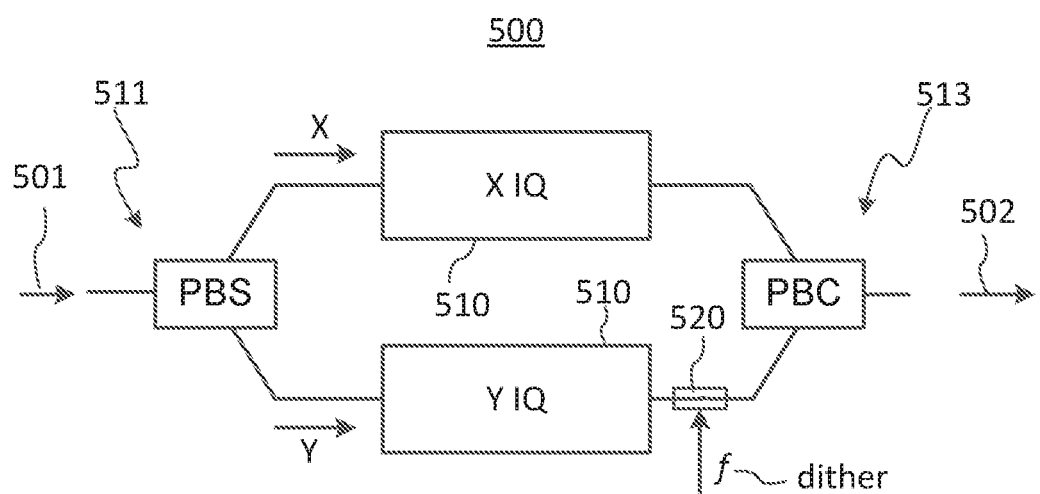
FIG. 6 is a is a schematic diagram of a dual-polarization (DP) optical IQ modulator with two nested Mach-Zehnder interferometers for separately modulating light of X and Y polarizations, and a dither modulator in one of the X and Y polarization branches.

Referring now to FIG. 6, there is schematically illustrated an example embodiment of an optical PM-QM transmitter 500 in which the Y-light is modulated with a dither tone at a distinct dither frequency f, or generally any distinct dither signal, prior to the polarization multiplexing with the X-light. Transmitter 500 may be implemented as a photonic integrated circuit (PIC), for example in a SOI chip using planar silicon waveguides, or another suitable material system. Input light 501 from a coherent light source, such as a suitable single-frequency semiconductor laser (not shown), is fed into a polarization beam splitter (PBS) 511, which splits it into the X-light and Y-light of two orthogonal polarizations, optionally rotating the polarization of one of them to match a preferred polarization mode of the PIC waveguides. For example PBS 511 may split input light 101 into TE mode (X-light) and TM mode (Y-light), and then converting the Y light from the TM to the TE mode. The X and Y lights are then separately modulated by two QM optical modulators 510, and then polarization multiplexed in orthogonal polarization states using a polarization beam combiner (PBC) 513 to obtain a PM-QM optical signal 502, which may then be transmitted to an optical receiver over a fiber optic link. PBC 511 may include a polarization rotator, or TE to TM converter, in one of it input ports. Each of the QM optical modulators 510 may be embodied, for example, as a nested MZM illustrated in FIG. 5A. Prior to the polarization multiplexing, one of the X-light and Y-light may be modulated in amplitude at the distinct dither frequency f to facilitate the polarization demultiplexing at the receiver. The dither modulation may be performed for example using a suitable variable optical attenuator (VOA) 520. The dither frequency f may be selected to be much lower than the data rate of the transmitter, for example in the kHz or low-MHz range, to simplify the generation of the dither signal and its detection at the receiver, and to reduce its interference with the transmitted data signal. The depth of the dither modulation may also be suitably low, for example a few percent, so as not to induce data errors at the receiver.

Figure 7:
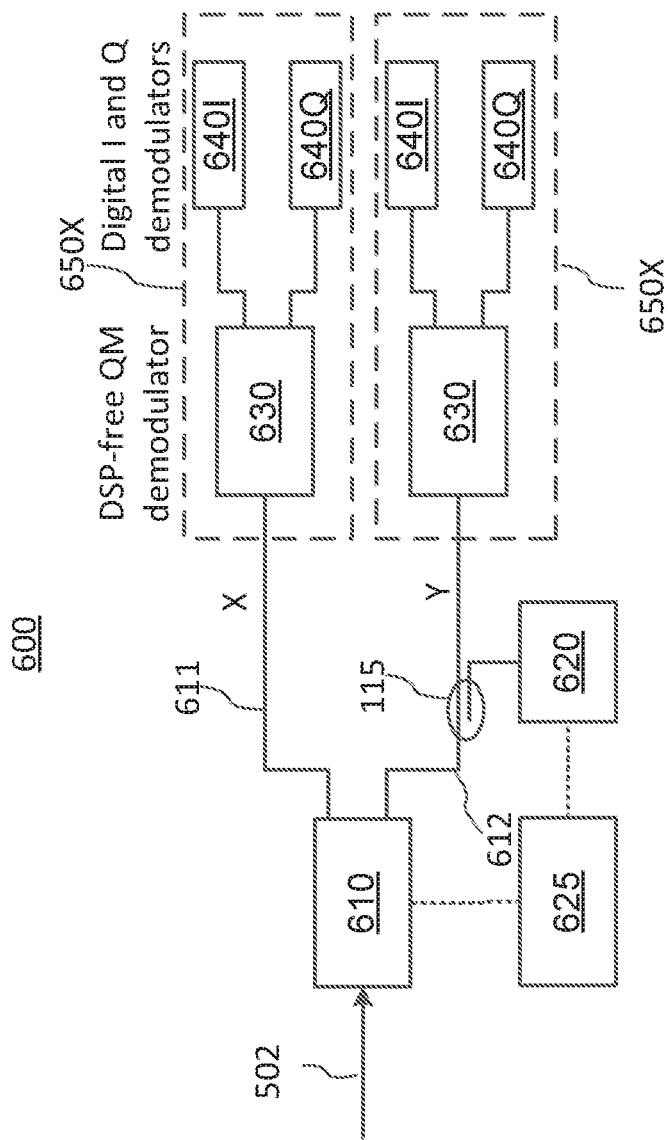
FIG. 7 is a schematic block diagram illustrating an optical receiver circuit for demodulating signals generated using the DP modulator of FIG. 4 with optical-domain polarization recovery and analog IQ demodulation.

Turning now to FIG. 7, there is schematically illustrated an optical PM-QM receiver 600 that is configured to implement polarization de-multiplexing of the PM-QM light 502 after its propagation in a fiber-optic link or another communication channel with polarization mode dispersion. Receiver 600 includes a tunable polarization splitter/controller 610 at its input that is configured to tunably split the received light into two light signals 611 and 612 in dependence on the polarization state of the received light. Polarization controllers capable of tunable polarization splitting that is fully adjustable by varying two or more polarization control signals are known in the art, and may be for example in the form of a PBS followed by a sequence of 2×2 optical couplers interspersed with two or more tunable phase shifters. A monitoring photodetector (MPD) 620 may be coupled at one of the output ports of the tunable polarization splitter 610, and may be configured to detect the presence of the dither frequency f in the corresponding light signal, and to output a dither strength signal indicative of the strength of the dither signal detected by MPD 620. The dither strength signal may then be provided to a control circuit 625 that is configured to vary the polarization control signal or signals so as to minimize or maximize the strength of the detected dither signal, thereby aligning the two light signals 611, 612 to the transmitter polarization channels X and Y.

By way of example, in one embodiment wherein the Y-light component of the PM-QM light 502 was modulated at the transmitter at the dither frequency f, the control circuit 625 may be configured to adjust the tunable polarization splitter 610 until the dither frequency f at the output of MPD 620 is maximized. In another embodiment wherein the X-light component of the PM-QM light 501 was modulated at the transmitter at the dither frequency f, tunable polarization splitter 610 may be adjusted until the dither frequency f at the output of MPD 620 is minimized. In both cases splitter 610, after the adjustment, splits the input light into the X-light and Y-light as generated at the transmitter site. These de-multiplexed X- and Y-optical signals 611, 612 may then be separately fed into two QM receivers 650X and 650Y for demodulation and further processing. Each of the QM receivers 650 may be embodied for example as illustrated in FIG. 3, and may include an optical heterodyne detector 340 followed by an IQ demodulation circuit 630, which is in turn followed by an I-channel signal processor 640I and a Q-channel signal processor 640Q. Signal processors 640I, 640Q may each be in the form, or include, a SerDes (serializer-deserializer) chip as known in the art.

Figure 8:
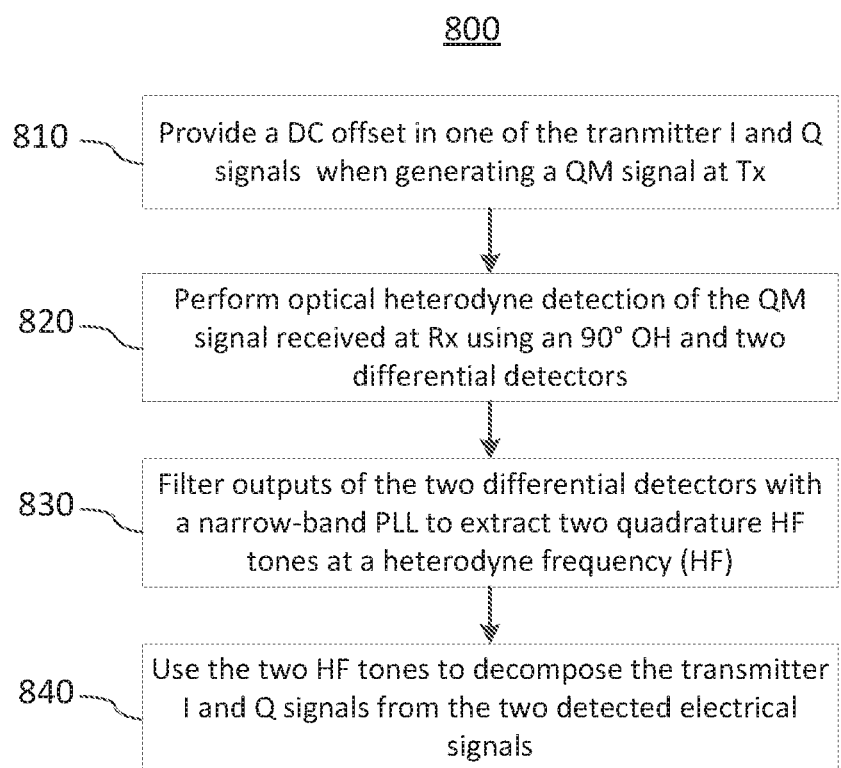
FIG. 8 is a flowchart of a method for demodulation of an optical QM signal with a transmitter DC offset.

Turning now to FIG. 8, a method 800 for IQ demodulation of QM light in accordance with an aspect of the present disclosure may include the steps or operations shown in the flowchart. Step or operation 810 is performed at a transmitter site, by providing an offset in one of the I-channel and Q-channel signals, for example as described hereinabove with reference to FIGS. 2B, 3, 5A and 5B. This offset may be in the form of a constant amplitude offset that is added to the amplitude of one of the I and Q modulation signals in each QM symbol interval. Steps or operations 820-840 are performed at a receiver site. At step or operation 820, optical quadrature heterodyne detection of the QM light is performed to obtain two electrical signals $V_1(t)$ and $V_2(t)$, each of which comprising the I-channel signal modulated at a heterodyne frequency (HF), the Q-channel signal modulated at the HF $\omega_{HF}$, and a heterodyne frequency (HF) tone, for example as may be represented by equations (4) and (5). The two electrical signals $V_1(t)$ and $V_2(t)$ may be viewed as coordinates of a vector [I(t, Q(t)] rotated by an angle equal to a yet unknown heterodyne phase $\phi_{HF}(t)=((\omega_t-\omega_l)t+(\phi_t-\phi_l))$.

At step or operation 830, the two electrical signals $V_1(t)$ and $V_2(t)$ are filtered with a narrow-band phase-sensitive filter to extract therefrom two quadrature HF tones (6) and (7) while preserving their relative phase. The operation 830 may be referred to as the phase recovery operation that recovers the heterodyne phase of the HF modulation for an unknown LO phase. At step or operation 840, the two quadrature HF tones obtained at 830 are used to decompose the I-channel and Q-channel signals from the two electrical signals $V_1(t)$ and $V_2(t)$. This operation may be viewed as a rotation of vector [$V_1(t)$, $V_2(t)$] by the HF phase recovery angle $\phi_{HF}(t)$, which effectively decouples the transmitter I-channel and Q-channel signals from the electrical signals $V_1(t)$ and $V_2(t)$ at the output of the heterodyne QM detector 340.

Advantageously, the approach to coherent detection of optical QM signals described hereinabove enables to perform direct LO phase recovery using relatively simple electrical circuits that may be implemented in analog electronics or using relatively simple digital electronics, such as few interconnected signal multipliers and adders, and do not require a high-power, expensive integrated circuit known as a DSP (digital signal processor). Thus, the aforedescribed approach enables to perform IQ demodulation at significant saving in cost and system power consumption.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings.

For example, it will be appreciated that different dielectric materials and semiconductor materials other than silicon, including but not limited to compound semiconductor materials of groups commonly referred to as A3B5 and A2B4, such as GaAs, InP, and their alloys and compounds, may be used to fabricate the optical circuits example embodiments of which are described hereinabove.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An apparatus for coherent demodulation of quadrature-modulated (QM) light, the QM light comprising two transmitter signals optically combined in quadrature, the apparatus comprising:
   an optical quadrature heterodyne receiver configured to receive the QM light and to obtain therefrom two electrical signals;
   a phase-sensitive filter circuit configured to detect a heterodyne frequency (HF) tone in each of the two electrical signals so as to preserve a relative phase therebetween; and,
   a demodulator circuit configured to decompose the two transmitter signals from the two electrical signals based at least in part on the HF tones to obtain two decomposed transmitter signals.

2. The apparatus of claim 1 wherein the optical quadrature heterodyne receiver comprises an optical mixer configured to mix the QM light with local oscillator (LO) light, wherein the LO light is shifted in frequency from the QM light by a heterodyne frequency $\omega_{HF}$.

3. The apparatus of claim 2 wherein the optical quadrature heterodyne receiver is configured to provide the two electrical signals comprising each a different combination of the two transmitter signals modulated by the heterodyne frequency $\omega_{HF}$.

4. The apparatus of claim 3 wherein the optical mixer comprises a 90° optical hybrid (OH), the 90° OH comprising four output ports.

5. The apparatus of claim 4 wherein the optical quadrature heterodyne receiver comprises two differential photodetectors coupled to the four output ports of the 90° OH for obtaining the two electrical signals.

6. The apparatus of claim 2 wherein the optical quadrature heterodyne receiver comprises a source of the local oscillator (LO) light.

7. The apparatus of claim 2 wherein the phase-sensitive filter circuit is configured to extract two quadrature HF tones from the two electrical signals.

8. The apparatus of claim 7 wherein the phase-sensitive filter circuit comprises one or more phase lock loops (PLL) circuits for extracting the two quadrature HF tones.

9. The apparatus of claim 7 wherein the one or more phase lock loops (PLL) circuits are locked to the heterodyne frequency $\omega_{HF}$.

10. The apparatus of claim 7 wherein the demodulator circuit comprises multiplying circuitry configured to multiply the two electrical signals by the two quadrature HF tones.

11. The apparatus of claim 10 wherein the multiplying circuitry is configured to multiply one of the two electrical signals by one of the two quadrature HF tones, to multiply the other of the two electrical signals by the other of the two quadrature HF tones, and to sum resulting multiplied signals.

12. The apparatus of claim 10 wherein the demodulator circuit comprises four signal multiplication circuits and two signal summing circuits.

13. The apparatus of claim 1 comprising two electrical processing circuits coupled to the demodulator circuit for individual processing of the two transmitter signals.

14. The apparatus of claim 1 wherein the demodulator circuit comprises analogue circuitry.

15. The apparatus of claim 1 wherein the phase-sensitive filter circuit comprises analogue circuitry.

16. The apparatus of claim 1 wherein the two transmitter signals comprise an I-channel signal and a Q-channel signal, and wherein the demodulator circuit is configured to decompose each of the I-channel and Q-channel signals from the two electrical signals using the HF tones.

* * * * *